United States Patent [19]

Schatz et al.

[11] Patent Number: 5,074,268
[45] Date of Patent: Dec. 24, 1991

[54] METHOD FOR THE OPERATION OF AN IC ENGINE OF THE PISTON TYPE

[75] Inventors: Oskar Schatz, Waldpromenade 16, D-8035 Guating; Thomas Steidele, Munich, both of Fed. Rep. of Germany

[73] Assignee: Oskar Schatz, Guating, Fed. Rep. of Germany

[21] Appl. No.: 489,713

[22] Filed: Feb. 28, 1990

Related U.S. Application Data

[63] Continuation of Ser. No. 267,180, Nov. 4, 1988, abandoned.

[30] Foreign Application Priority Data

Nov. 6, 1987 [DE] Fed. Rep. of Germany ....... 3737824

[51] Int. Cl.$^5$ .............................................. F02D 9/08
[52] U.S. Cl. .................................................. 123/403
[58] Field of Search ............... 123/403, 198 F, 52 MF

[56] References Cited

U.S. PATENT DOCUMENTS

| | | | |
|---|---|---|---|
| 2,337,982 | 12/1943 | Ericson | 123/52 MF |
| 4,094,277 | 6/1978 | Goto et al. | 123/52 MF |
| 4,359,024 | 11/1982 | Lootens et al. | 123/403 |
| 4,509,466 | 4/1985 | Bernardoni et al. | 123/52 MF |

Primary Examiner—Andrew M. Dolinar
Assistant Examiner—M. Macy
Attorney, Agent, or Firm—Harness, Dickey & Pierce

[57] ABSTRACT

In the context of an IC engine of the piston type comprising an inlet duct leading to at least one combustion chamber of the engine, at least one inlet valve which is placed between the inlet duct and each combustion chamber and determines the end of inlet of the combustion chamber, and an additional valve placed upstream from the inlet valve, the additional valve is open on opening of the inlet valve, closes shortly thereafter and opens again before the inlet valve closes.

5 Claims, 1 Drawing Sheet

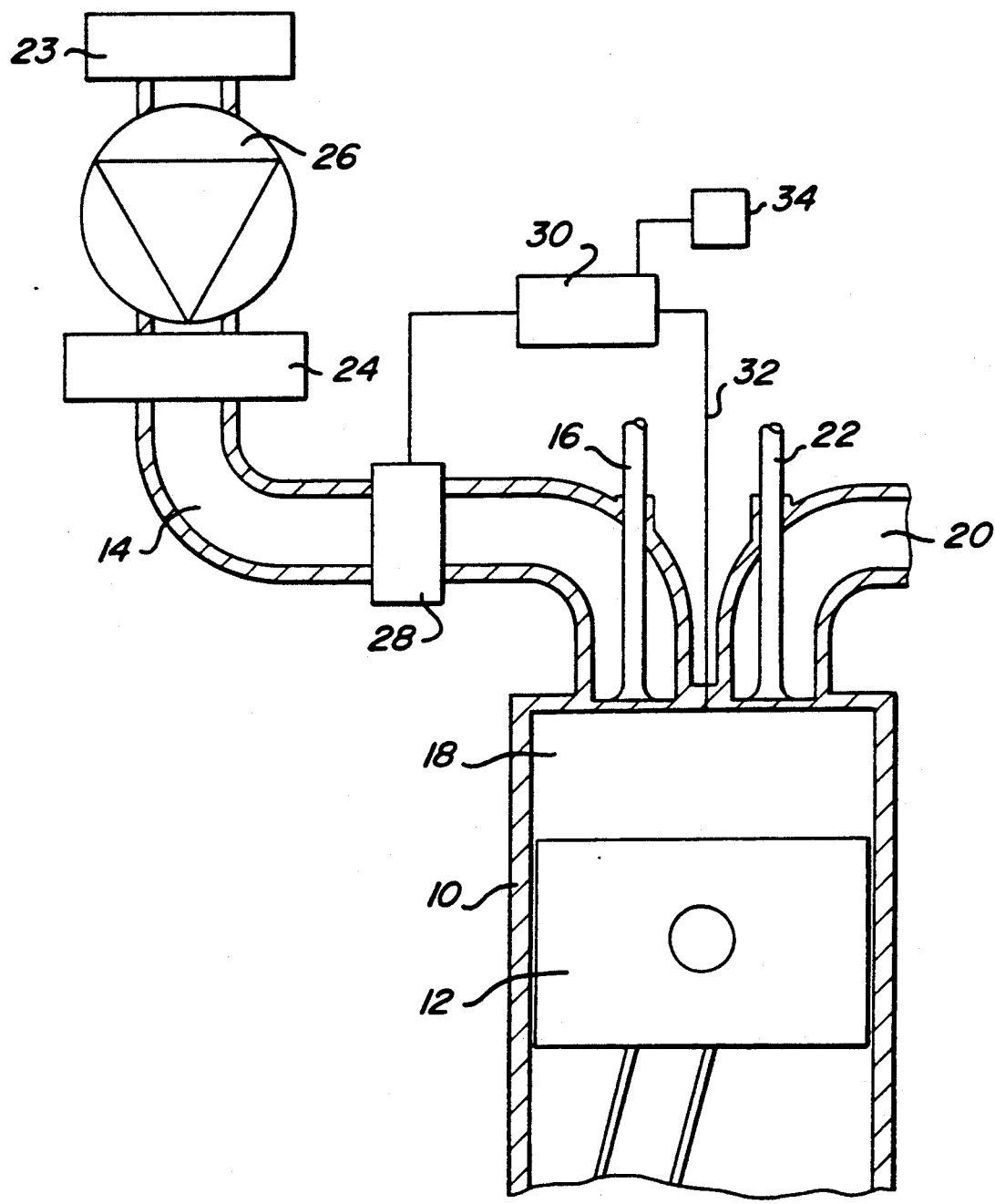

METHOD FOR THE OPERATION OF AN IC ENGINE OF THE PISTON TYPE

This is a continuation of U.S. patent application Ser. No. 07/267,180, filed Nov. 4, 1988, entitled "Method for the Operation of an IC Engine of the Piston Type" now abandoned.

The invention relates to a method for the operation of an IC engine of the piston type comprising an inlet duct leading to at least one combustion chamber of the engine, at least one inlet valve which is placed between the inlet duct and each combustion chamber and determines the start of inlet and the end of inlet into the combustion chamber, and an additional valve arranged upstream from the inlet valve.

Such method are known in the context of induction engines in order to delay the start of inlet in relation to the opening of the inlet valve in accordance with certain operational parameters so that more especially in the case of lower engine speeds it is possible to produce an increase in the air supply, since with a delay in the opening of the additional valve after the opening of the inlet valve firstly the charge in the inlet duct between the additional valve and the inlet valve expands into the combustion chamber and vacuum is produced in the combustion chamber. The difference in pressure upstream and downstream from the additional valve leads after such opening to a correspondingly high flow velocity of the charge flowing into the combustion chamber. This flow velocity is slowed down towards the end of the piston stroke so that there is a dynamic increase in pressure even before the closing of the inlet valve. The return of the charge from the combustion chamber may be prevented by timely closing of the additional valve or of the inlet valve.

In order to cause the dynamic increase in pressure to take place as far as possible towards the end of the induction stroke of the engine piston, the additional valve has to remain closed a comparatively long time so that there is a considerable decrease in pressure in the combustion chamber, such decrease for its part on the one hand not being necessary for the desired dynamic effect and on the other hand involving a comparatively large expenditure of work. In order to limit the loss in power, the additional valve may be opened earlier in order to prevent return flow of the charge out of the combustion space so that on the other hand the peak of the dynamic increase in pressure does not occur at the optimum point in time in the combustion chamber and as a result the possible maximum filling of the engine cylinder is not possible.

The object of the invention is that of so devising a method of the initially described type that its advantages may be profited from without the disadvantages noted and in particular the peak of the dynamic increase in pressure may be set, independently of its size, and thus adapted in the best possible manner to the respective operational conditions without this leading to an unnecessary large decrease in pressure in the combustion chamber. Furthermore the dynamic increase in pressure is to be enhanced despite the decrease in the pressure drop in the combustion chamber. Furthermore the necessary length of the induction pipe upstream from the additional valve, whose inlet opening size leads to a positive reflexion of the incoming negative pressure wave, is to be kept as short as possible in order to keep down the overall size.

In accordance with the invention this aim is achieved by the feature that in the initially described method the additional valve is open at the time of the opening of the inlet valve and during a closing phase spaced in time from the start of inlet and the end of inlet is temporarily closed.

Because the additional valve is open at the start of the induction phase, it is possible for the combustion air to enter the combustion chamber without hindrance. The end of the closing phase of the additional valve may be selected with the purpose of keeping to the most favorable difference in time with respect to the end of inlet of the inlet valve so that it is not possible for the charge to flow back. Owing to the interruption of the charge flow during the closing phase of the additional valve prior to the additional valve a backpressure is produced, while downstream from the additional valve the is a vacuum. The pressure difference between the backpressure and the vacuum determines the level of the dynamic effect occurring at the end of the induction phase and may be controlled by the duration of the closing phase of the additional valve. Furthermore the duration of the closing phase of the additional valve reduces the output of expulsion energy of any charger present to the engine. In this respect the possibility of shortening the length of the induction pipe upstream from the additional valve depends on decreasing the amount of time elapsing between the closing phase of the additional valve and the end of the inlet by the inlet valve.

In accordance with an advantageous development of the invention the timing difference between the closing phase of the additional and the end of inlet is such that the maximum value of the increase in pressure occurring after the end of the closing phase takes place directly prior to the end of inlet in the combustion chamber.

Preferably the duration and timing of the closing phase of the additional valve are controlled so as to reflect the operational parameters of the engine. Thus for instance in the case of the diesel engine under a low load an increased filling of the engine cylinder is not desired because of emission and mileage reasons. A useful development of the invention is thus such that the closing phase of the additional valve is timed so as to not come within the range of the opening phase of the additional valve. In this respect it is particularly desirable fir the closing phase of the additional valve to be changed in its timing so as to take place prior to the opening phase of the inlet valve so that inertia effects are minimized in practice.

Moreover both in the case of a diesel engine and also in the case of a gasoline engine it is desirable for reasons of fuel consumption to make the additional valve inoperative in the upper speed range, this being possible by means of the described phase displacement of the closing phase of the additional valve.

The invention will now be described in detail on the basis of the ensuing account of an inlet duct system, as shown diagrammatically, of an IC engine.

The drawing shows only one cylinder 10 of an IC engine, which contains an engine piston 12. An inlet duct 14 opens via an inlet valve 16 into the combustion chamber 18 within the cylinder 10. An exhaust gas duct 20 is connected via an outlet duct 22.

The inlet duct 14 is supplied via an air filter 23 and an air manifold 24 with air, which is drawn in by the piston 12 after opening of the inlet valve 16. Alternatively it is possible to have a charging device 26 upstream from the air manifold 24 in order to compress the charge. In certain cases fuel may be introduced into the air flowing in via the air filter 23 so that in place of air a fuel air mixture flows via the inlet valve 16 into the combustion chamber.

Upstream from the inlet valve 16 there is an additional valve 28 arranged in the inlet duct 14, such additional valve being capable of shutting off the inlet valve 14. This additional valve 28 is provided with a controlling unit which is only shown diagrammatically and is referenced 30. Via a line 32 it receives information concerning the operating state of the engine and possibly information, derived for instance from the accelerator pedal 34 concerning the intention of the driver of a motor vehicle equipped with the engine in accordance with engine demand.

In the neutral setting the additional valve 28 is opened so that the charge may flow into the cylinder 10. Dependent on the data supplied to the control unit 30 the additional valve 28 is closed for a short time, the closing phase being terminated with such a difference in time from the time of closing of the inlet valve 16 that the peak of the pressure increase caused by this closing phase in the manner described below takes place in the combustion chamber with such a timing that the inlet valve 16 closes before the pressure in the combustion chamber 18 may be decreased again by return flow of the charge.

During the closing phase of the additional phase 28 the charging current in the inlet duct 14 is slowed down so that the there is a backpressure effect upstream from the additional valve 28 with the increase in pressure. At the same time the pressure in the combination chamber 18 is lowered. The increase in pressure upstream from the additional valve 28 and the decrease in pressure in the combustion chamber 18 act jointly and cause the speed of the charge flowing into combustion chamber 18 shortly prior to the closing phase to be faster than the flow speed of the charge prior to the closing phase, this meaning that during slowing down the charge current there is an enhanced increase in pressure. Since it is not possible for this pressure to be let off because the closing point of the inlet valve is timed to take place with the occurrence of the pressure peak the pressure increase is of full effect to increase the cylinder charge.

We claim:

1. A method for operating a piston type IC engine comprised of an inlet duct leading to at least one combustion chamber of the engine, at least one inlet valve which is placed between the inlet duct and each combustion chamber and means for determining duration of time between opening of the at least one inlet valve and closing of the at least one inlet valve of the combustion chamber, and an additional valve placed upstream from the at least one inlet valve, and in operable communication with said determining means, said method comprising:

opening said additional valve upon opening of said at least one inlet valve;

receiving information concerning demand on the engine and operational parameters of the internal combustion engine by said determining means for varying opening and closing of said additional valve, controlling duration of time said additional valve is open by said determining means independently of the opening of said at least one inlet valve; and closing said additional valve in response to said information transmitted to said determining means independently of the closing of said at least one inlet valve such that said additional valve is closed prior to closing of said at least one inlet valve so that upon successive opening of said at least one inlet valve an additional valve high velocity flow will enter into said combustion chamber supercharging said combustion chamber.

2. The method as claimed in claim 1, characterized in that the closing of the additional valve so differs in time prior to the closing of the at least one inlet valve such that dynamic pressure increases take place directly prior to the closing of the at least one inlet valve in the combustion chamber.

3. The method as claimed in claim 1 or claim 2, characterized in that closing of the additional valve is controlled in duration and timing in a way dependent on the operational parameters of the engine.

4. The method as claimed in claim 3, characterized in that the closing of the additional valve is changed in accordance with operational parameters of the engine out of a range of the opening phase of the inlet valve.

5. The method as claimed in claim 4, characterized in that the closing of the additional valve is changed so as to come before the opening of the inlet valve.

* * * * *